United States Patent Office 2,756,251
Patented July 24, 1956

2,756,251

PREPARATION OF MONOMERIC α-CYANOACRYLATES

Frederick B. Joyner and Newton H. Shearer, Jr., Kingsport, Tenn., assignors to Eastman Kodak Company, Rochester, N. Y., a corporation of New Jersey No Drawing. Application March 23, 1954,
Serial No. 418,216

15 Claims. (Cl. 260—465.4)

This invention relates to the preparation of α-cyanoacrylates in monomeric form, and is particularly concerned with the depolymerization of polymeric α-cyanoacrylates to give monomers useful in adhesive compositions.

The monomeric form of an α-cyanoacrylate is usually prepared by the depolymerization of a polymer thereof. The polymers can be prepared in any desired manner but are advantageously prepared by reacting a cyanoacetate with formaldehyde or a polymer of formaldehyde in the presence of a basic condensation catalyst. The reaction between the cyanoacetate and the formaldehyde can be effected in aqueous medium employing an aqueous solution of formaldehyde as described in Ardis U. S. Patent 2,467,927. Preferably, however, the polymeric α-cyanoacrylates are prepared by reaction in non-aqueous media as described in the copending application of Frederick B. Joyner and Gary F. Hawkins, Serial No. 415,422, filed March 10, 1954, now Patent No. 2,721,858.

The present invention is particularly concerned with the depolymerization of the polymeric α-cyanoacrylates formed by these or similar methods. Heretofore it has been the practice to depolymerize such polymers by merely heating the polymer to a temperature of about 200 to 300° C. under a reduced pressure and in the presence of one or more polymerization inhibitors whereby vapors of the monomeric α-cyanoacrylate are evolved and collected.

Monomeric α-cyanoacrylates are useful in molding compositions and the like but find particular utility as universal adhesives which can be used to bond almost any materials together without the application of heat or pressure. The utility of adhesive compositions comprising monomeric α-cyanoacrylates is disclosed in the copending application of Harry W. Coover, Jr., and Newton H. Shearer, Serial No. 318,325, filed November 1, 1952.

Although monomeric α-cyanoacrylates have been prepared heretofore, such materials have usually been prepared on a relatively small scale, and it has been difficult to adapt the process to large scale manufacture. The use of temperatures in excess of 200° has usually been necessary to effect the depolymerization even under reduced pressure. These conditions have led to deleterious decomposition and discoloration of the polymer with a resultant lowered yield of monomeric ester. The polymeric alkyl α-cyanoacrylates melt readily at temperatures of about 165° C. or below without decomposition, and the depolymerization has thus been usually effected by direct heating of the molten mass. The decomposition and discoloration has thus not been a result of having to use high temperatures for the melting of the polymer but rather because temperatures well above the melting temperature have had to be used for prolonged periods of time in order to successfully depolymerize the molten polymer. This objectionable decomposition has been particularly marked when it is attempted to depolymerize batches of polymer weighing over about 500 grams.

It is accordingly an object of this invention to provide a new and improved method for depolymerizing polymeric α-cyanoacrylates without the deleterious decomposition and objectionable discoloration which have been attendant to the processes used heretofore.

Another object of the invention is to provide a depolymerization method in which polymeric α-cyanoacrylates depolymerize at lower temperatures and in shorter times than has been the case when the polymers were depolymerized from a molten mass.

Another object of the invention is to depolymerize polymeric α-cyanoacrylates at temperatures well below the decomposition temperatures for such cyanoacrylates and approaching the melting temperatures of the polymer.

Another object of the invention is to prepare monomeric α-cyanoacrylates on a large scale without objectionable lowering in yield.

Other objects will be apparent from the description and claims which follow.

These and other objects are attained by means of this invention as described in detail hereinafter with particular reference to certain preferred embodiments thereof. The depolymerization of polymeric α-cyanoacrylates is effected in accordance with this invention by heating the polymer to a temperature above its melting point in a tertiary ester of phosphoric acid which is liquid at temperatures above the melting temperature of the polymer. The depolymerization is effected under reduced pressure, preferably below 15 mm. Hg and desirably at a pressure of 1–10 mm. Hg or lower. The depolymerization temperature will, of course, depend upon the particular pressure employed and also upon the moisture content of the polymer. Particularly advantageous results are obtained employing polymers which have a water content of less than 0.4%. Such low moisture polymers are readily obtained when the polymer is formed in non-aqueous medium and the solvent and water are distilled off azeotropically.

By the use of tertiary esters of phosphoric acid as depolymerization medium, the depolymerization can be effected under much less stringent conditions than would otherwise be necessary, and the depolymerization temperature can be lowered as much as 30 to 100° C. below that which would be employed if the depolymerization were effected on the molten polymer alone or on the polymer dispersed in a heat transfer medium other than the ester embodying this invention. The reason why such lowered temperatures and higher yields are attained by means of this invention is not wholly understood. It is obvious, however, that the tertiary esters of phosphoric acid do not merely function as a heat transfer medium since other materials which operate satisfactorily as heat transfer media do not give the advantageous results which are attained by means of this invention. Thus, for example, as is shown hereinafter, other synthetic oils such as the synthetic nonpetroleum oil sold commercially under the name of Ucon oil do not lower the depolymerization temperature and increase the yield in the manner of the tertiary ester of phosphoric acid. The results obtained are also unexpected since the polymers melt readily without decomposition, and hence there is no problem of charring of the polymer before it is melted. When the molten polymer is employed, however, the temperature must be raised during the course of the polymerization to a temperature far above the metling point of the polymer in order to attain any satisfactory depolymerization. The tertiary esters of phosphoric acid thus do not function merely as a heat transfer medium but exert some unknown effect on the depolymerization reaction itself. This may be due in part to a slight solvent action of the phosphoric acid ester on the polymer, although it is not intended that the invention shall be limited by any theory which might be advanced by way of explanation.

The invention is applicable for preparing any of the monomeric esters of α-cyanoacrylic acid having the general formula

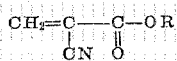

wherein R is an alkyl group of 1 to 16 carbon atoms, a cyclohexyl group or a phenyl group. Of these cyanoacrylates, the alkyl esters in which the alkyl group is a methyl, ethyl, n-propyl, isopropyl, isobutyl or amyl group are preferred since they are particularly effective as adhesives. These esters are prepared directly from the corresponding polymeric esters which can be formed by the choice of a suitable cyanoacetate ester. Thus, for example, monomeric methyl α-cyanoacrylate can be prepared by reacting methyl cyanoacetate with formaldehyde in the presence of a basic catalyst to form polymeric methyl α-cyanoacrylate which can then be depolymerized in accordance with this invention to give the corresponding monomeric methyl α-cyanoacrylate. The other esters as described can be formed in a similar manner.

In practicing the invention, any of the alkyl or aryl tertiary esters of phosphoric acid can be used as the depolymerization medium. The higher boiling esters of phosphoric acid such as the triphenyl esters, tricresyl esters, or tri-2-ethylhexyl esters are preferably employed since they facilitate the large scale pyrolysis and do not require a fractional distillation to separate the ester from the product. The lower boiling tertiary esters of phosphoric acid such as the lower alkyl esters can be used with good results, however, even though they also tend to distill over with the monomer. Thus any of the alkyl esters having from about 4 to about 22 carbon atoms in the alkyl group can be employed in practicing the invention as well as tertiary phenyl esters and esters wherein the phenyl group is substituted with a lower alkyl group, a hydroxyl group, or both. Thus, for example, triphenyl phosphoric acid esters can be used as well as the corresponding tricresyl esters, and trixylyl esters. Other suitable esters include trialkyl esters such as tributyl phosphate, trihexyl phosphate, tri-2-ethylhexyl phosphate, tridecyl phosphate, tridodecyl phosphate, and similar trialkyl esters wherein the alkyl groups are either straight or branched chain.

The depolymerization is facilitated by including a polymerization inhibitor and desirably phosphoric anhydride in the depolymerization mixture. Other polymerization inhibitors can be employed in the depolymerization mixture, including any of the acidic inhibitors such as antimony pentoxide, picric acid, hydroquinone, tertiary butyl catechol, metaphosphoric acid, maleic anhydride, ferric chloride, or the like. Desirably the monomer thus formed is collected in a receiver which also contains a polymerization inhibitor such as described. Particularly good results are obtained when an acidic gaseous inhibitor such as sulfur dioxide, nitric oxide, hydrogen fluoride, or the like is introduced into the reaction vessel and allowed to mix with the monomeric vapors being evolved. Such gaseous inhibitor also dissolves in the monomeric vapors to some extent and hence remains in the monomer after it has been condensed. Best results are obtained employing phosphoric anhydride in the depolymerization vessel and introducing sulfur dioxide into the system as the gaseous inhibitor. A particularly stable composition is obtained when the receiving vessel contains a small amount of hydroquinone whereby a monomer product is obtained which contains a mixture of sulfur dioxide and hydroquinone.

The process embodying this invention can be carried out batchwise, or it can be carried out in continuous fashion, particularly when a high boiling phosphate ester is employed whereby the phosphate ester remains in the depolymerization vessel when the monomer is distilled therefrom. Thus, for example, when the polymeric α-cyanoacrylate is prepared in non-aqueous medium and the water formed during the reaction is removed azeotropically, no further drying is necessary, and the polymer can be melted and flowed into the depolymerization vessel containing the tertiary phosphate ester wherein it can be continuously depolymerized.

The advantages of the process embodying this invention are illustrated by the following examples of certain preferred embodiments thereof. It will be understood, however, that the examples are included merely for purposes of illustration and are not intended to limit the scope of the invention unless otherwise specifically indicated.

*Example 1*

In order to understand the advantageous results obtained by means of this invention, the results obtained with a small scale dry depolymerization are set out in this example for comparison with a large scale depolymerization embodying the invention and one carried out in accordance with practice used heretofore. One hundred grams of dry polymethyl α-cyanoacrylate (prepared by condensing formaldehyde with methyl cyanoacetate) was mixed with 2 g. of phosphoric anhydride and 1 g. of hydroquinone. Thermal depolymerization was effected by heating the mixture under reduced pressure in the presence of sulfur dioxide gas. A base temperature of about 220° C. was required to melt the polymer and effect initial depolymerization. The base temperature was gradually increased as the depolymerization proceeded in order to maintain a steady rate of distillation. The base temperature employed was 220–285° C. (largely 225–241° C.). The monomeric methyl α-cyanoacrylate distilled over at a head temperature of 33–144° C. at 2.6–10.0 mm. Hg pressure and was collected in a Dry-Ice-cooled receiver which contained 1 g. phosphoric anhydride. The yield of crude monomer was 82.5% of the theoretical amount.

*Example 2*

Similar results are obtained on a small scale without the use of the tertiary ester of phosphoric acid by treating polyethyl α-cyanoacrylate in accordance with the process of the preceding example. The base temperature required was 220–295° C. The monomeric ethyl α-cyanoacrylate distilled over at a head temperature of 55–140° C. and a pressure of 3.2 to 9.0 mm. Hg. The depolymerization was stopped when repolymerization began to occur in the still head. The yield of crude monomer was 80.5%.

*Example 3*

As can be seen from the preceding examples, the depolymerization proceeded readily when carried out on a small scale. Unexpectedly, however, when an attempt was made to carry out the depolymerization on a large scale using no reaction medium other than the molten polymer, the results were not sufficiently good for commercial operations. Thus 3405 g. of dry polyethyl α-cyanoacrylate was thoroughly mixed with 68 g. of phosphoric anhydride and 34 g. hydroquinone. Thermal depolymerization was carried out by heating the mixture in vacuo in the presence of sulfur dioxide gas. A base temperature ranging from 205° to 220° C. was employed. The monomeric ethyl α-cyanoacrylate distilled over at a vapor temperature of 67–108° C. at 10–14 mm. Hg pressure. Repolymerization occurred in the system after 810 g. (24% of theory) crude monomer had been collected in the Dry-Ice-cooled receiver containing 6.8 g. phosphoric anhydride. This monomer was of poorer quality than normal.

*Example 4*

An attempt was made to carry out the depolymerization reaction on a small scale using a synthetic non-petroleum oil other than a tertiary ester of phosphoric acid as the reaction medium. The results that were obtained thereby were poor even though the reaction was carried out on a small scale. In this run 100 g. of dry polymethyl α-cyanoacrylate was mixed with 4 g. phosphoric anhydride, 2 g. hydroquinone and 60 g. Ucon oil (carbide and carbon). Depolymerization was carried out by heating the mixture under vacuum in the presence of sulfur dioxide gas. The base temperature was 190° C. before significant distillation of monomeric methyl α-cyanoacrylate occurred. The operation required an over-all base temperature ranging from 190° to 240° C. The monomer distilled with a vapor temperature of 45–96° C. at 2.0–8.8 mm. Hg pressure. A 53% yield of crude methyl α-cyanoacrylate was collected in the Dry-Ice-cooled receiver containing 1 g. phosphoric anhydride. This monomer was of poorer quality than normal.

*Example 5*

As was illustrated in Example 3, the large scale depolymerization of α-cyanoacrylate using no reaction medium other than the molten polymer gave very low yields (24%) of the desired monomer. The base temperature in that case was well over 200° C. In contrast to this, the yield was more than doubled when the polymerization was effected in accordance with this invention. Thus 1700 g. of polymethyl α-cyanoacrylate was thoroughly mixed with 68 g. of phosphoric anhydride, 59.5 g. hydroquinone and 1530 g. tricresyl phosphate. Thermal depolymerization of the polymer was effected by heating the mixture under reduced pressure in the presence of sulfur dioxide gas. Continuous distillation of monomeric methyl α-cyanoacrylate occurred when the base temperature reached 163° C. The depolymerization proceeded smoothly with rapid distillation of monomer. The vapor temperature was 69–125° C. at 9.1–21.0 mm. Hg pressure. The base temperature was gradually increased to 193–196° C. The yield of good quality methyl α-cyanoacrylate was 1116 g. (65.6% of the theory).

*Example 6*

In the case of the depolymerization carried out in accordance with this invention, increasing the amount of polymer being depolymerized does not lower the yield of desired monomer. Thus, for example, the process of the preceding example was followed using 4000 g. of polymethyl α-cyanoacrylate, 160 g. of phosphoric anhydride, 140 g. of hydroquinone and 3600 g. of tricresyl phosphate. The yield of methyl α-cyanoacrylate monomer was 78% of the theoretical amount. This compares favorably with the yield obtained in small scale laboratory depolymerization reactions. It is thus apparent that by means of this invention the production of monomeric α-cyanoacrylate can be put on a commercial scale without a significant loss in yield. Furthermore, the process of this invention offers a significant advantage over even the laboratory scale reaction in that a lower depolymerization temperature can be employed with a resultant saving in the cost of operating the process. This is particularly important when the heating of large amounts of material is involved.

*Example 7*

The process embodying this invention is particularly adapted for large scale depolymerization but also gives excellent results with small scale reactions. Thus, for example, 100 g. of dry polymethyl α-cyanoacrylate was mixed with 4 g. of phosphoric anhydride, 2 g. of hydroquinone and 60 g. of triphenyl phosphate. Depolymerization was carried out by heating the mixture under vacuum in the presence of sulfur dioxide gas. The base temperature required for evolution of monomer was 173–191° C. The monomeric methyl α-cyanoacrylate distilled with a vapor temperature of 40–63° C. at 1.4–2.6 mm. Hg pressure. The yield of monomer obtained under these conditions was 75% of the theoretical amount.

*Example 8*

Similar results are obtained using other tertiary esters of phosphoric acid including the trialkyl esters. Thus, for example, 100 g. of dry polymethyl α-cyanoacrylate was mixed with 4 g. of phosphoric anhydride, 2 g. of hydroquinone and 60 g. of tri-2-ethylhexyl phosphate, and depolymerization was effected by heating under vacuum in the presence of sulfur dioxide. The monomeric methyl α-cyanoacrylate distilled with a vapor temperature of 30–96° C. at 1.6 to 2.5 mm. Hg pressure. The base temperature was 168–193° C. throughout most of the reaction. The yield of monomer was 70% of the theoretical amount.

*Example 9*

The process of the invention is applicable to any of the polymeric α-cyanoacrylates as described hereinabove. Thus, for example, 1500 g. of polyethyl α-cyanoacrylate were employed in the process of Example 5 instead of the corresponding polymethyl compound. The results obtained corresponded to those obtained with the polymethyl polymer.

Thus by means of this invention the commercial production of monomeric α-cyanoacrylates is made possible with advantages over even the smaller scale processes practiced heretofore. The process of this invention not only results in high yields of monomer when using large amounts of polymer but also results in a significant lowering of the depolymerization temperature. The use of tertiary esters of phosphoric acid in accordance with the invention gives advantages of dry depolymerization as well as depolymerization using a material which functions merely as a heat transfer medium.

The monomers which are prepared in accordance with this invention are entirely suitable for use in adhesive applications. By the use of an acidic inhibitor during the depolymerization reaction, monomeric products having excellent shelf stability are obtained. The products which are desirably prepared contain about 0.002% sulfur dioxide and about 0.1% hydroquinone. Excellent results are obtained with hydroquinone concentrations of from 0.001 to 0.05% and sulfur dioxide concentrations of from 0.001 to 0.003% by weight based on the weight of the monomer. The monomer can be used directly for polymerization, either in a thin film in a laminating application or in bulk in a molding application. When the monomer is used as an adhesive to form laminated articles, it is not necessary to add a polymerization catalyst or to heat the monomer in order to obtain polymerization. Instead the monomer autopolymerizes within a few seconds after being spread in a thin film.

In some cases, it may be desirable to increase the viscosity of the monomeric product by adding to it a suitable polymeric material such as polymeric α-cyanoacrylate, cellulose ester, polyacrylate, polymethacrylate, or similar thickening agent. This can be done after the depolymerization has been effected.

Athough the invention has been described in considerable detail with particular reference to certain preferred embodiments thereof, variations and modifications can be effected within the spirit and scope of the invention as described hereinabove and as defined in the appended claims.

We claim:

1. The method of making monomeric α-cyanoacrylate ester which comprises depolymerizing a polymeric ester of α-cyanoacrylic acid by heating the polymer in a tertiary ester of phosphoric acid at a temperature above the melting point of said polymer and at a pressure below 15 mm. Hg.

2. The method of making monomeric α-cyanoacrylate ester which comprises depolymerizing a polymeric ester of α-cyanoacrylic acid by heating the polymer at a temperature above its melting point and at a pressure below 15 mm. Hg in a trialkyl ester of phosphoric acid.

3. The method of making monomeric α-cyanoacrylate ester which comprises heating a polymeric ester of α-cyanoacrylic acid at a temperature above its melting point and a pressure below 15 mm. Hg in a triaryl ester of phosphoric acid.

4. The method of making monomeric α-cyanoacrylate ester which comprises heating a polymeric ester of α-cyanoacrylic acid at a temperature above its melting point and at a pressure below 15 mm. Hg in triphenyl phosphate.

5. The method of making monomeric α-cyanoacrylate ester which comprises heating a polymeric ester of α-cyanoacrylic acid at a temperature above its melting point and a pressure below 15 mm. Hg in an alkylated phenyl triester of phosphoric acid.

6. The method of making monomeric α-cyanoacrylate ester which comprises heating a polymeric ester of α-cyanoacrylic acid at a temperature above its melting point and a pressure below 15 mm. Hg in tricresyl phosphate.

7. The method of making monomeric α-cyanoacrylate ester which comprises heating a polymeric ester of α-cyanoacrylic acid at a temperature above its melting point and a pressure below 15 mm. Hg in a higher alkyl triester of phosphoric acid.

8. The method of making monomeric α-cyanoacrylate ester which comprises depolymerizing a polymeric ester of α-cyanoacrylic acid in a high boiling liquid triester of phosphoric acid by heating the mixture to a temperature above the melting point of the polymer and subjecting it to a pressure below 15 mm. Hg, said temperature and pressure being correlated to distill monomeric α-cyanoacrylate ester from the reaction mixture without substantial distillation of said phosphoric acid triester.

9. The method of making monomeric α-cyanoacrylate ester which comprises depolymerizing an α-cyanoacrylate ester polymer by heating said polymer at a temperature above its melting point and a pressure below 15 mm. Hg in admixture with a tertiary ester of phosphoric acid and with phosphoric anhydride, and thereby distilling monomer vapors from the reaction mixture, mixing the monomer vapors with sulfur dioxide gas, and condensing the monomer vapors to obtain monomeric α-cyanoacrylate ester in liquid form.

10. The method which comprises heating a mixture of an α-cyanoacrylate ester polymer, an alkyl triester of phosphoric acid and phosphoric anhydride at a temperature above the melting point of said polymer and a pressure below 15 mm. Hg, and thereby distilling monomer vapors from the reaction mixture, mixing said monomer vapors with sulfur dioxide gas, and condensing the monomer vapors to obtain monomeric α-cyanoacrylate ester in liquid form.

11. The method which comprises heating a mixture of a polymeric α-cyanoacrylate ester, an aryl triester of phosphoric acid and phosphoric anhydride at a temperature above the melting point of the polymer and a pressure below 15 mm. Hg, and thereby distilling monomer vapors from the reaction mixture, mixing the monomer vapors with sulfur dioxide gas, and condensing the monomer vapors to obtain monomeric α-cyanoacrylate ester in liquid form.

12. The method which comprises heating a mixture of an α-cyanoacrylate ester polymer, a higher alkyl triester of phosphoric acid and phosphoric anhydride at a temperature above the melting point of said polymer and a pressure below 15 mm. Hg, and thereby distilling monomer vapors from the reaction mixture, mixing the monomer vapors with sulfur dioxide gas, and condensing the monomer vapors to obtain monomeric α-cyanoacrylate ester in liquid form.

13. The method which comprises heating a mixture of an alkyl α-cyanoacrylate polymer, triphenyl phosphate and phosphoric anhydride at a temperature above the melting point of said polymer and a pressure below 15 mm. Hg, and thereby distilling monomer vapors from the reaction mixture, said temperature and pressure being correlated to cause distillation of said monomer vapors without substantial distillation of said triphenyl phosphate, mixing the monomer vapors with sulfur dioxide gas, and condensing the monomer vapors to obtain alkyl α-cyanoacrylate monomer in liquid form.

14. The method which comprises heating a mixture of an alkyl α-cyanoacrylate polymer, tricresyl phosphate and phosphoric anhydride at a temperature above the melting point of said polymer and a pressure below 15 mm. Hg, said temperature and pressure being correlated to distill monomer vapors from the reaction mixture without substantially distilling said tricresyl phosphate, mixing the monomer vapors with sulfur dioxide gas, and condensing the monomer vapors to obtain monomeric alkyl α-cyanoacrylate in liquid form.

15. The method which comprises heating a mixture of an alkyl α-cyanoacrylate polymer, tri-2-ethyl-hexyl phosphate and phosphoric anhydride at a temperature above the melting point of said polymer and a pressure below 15 mm. Hg, said temperature and pressure being correlated to cause distillation of monomer vapors from the reaction mixture without substantially distilling said phosphate, mixing the monomer vapors with sulfur dioxide gas, and condensing the monomer vapors to obtain monomeric alkyl α-cyanoacrylate in liquid form.

References Cited in the file of this patent

UNITED STATES PATENTS

| | | |
|---|---|---|
| 2,467,927 | Ardis | Apr. 19, 1949 |
| 2,568,636 | Japs | Sept. 18, 1951 |